Patented July 26, 1938

2,124,884

UNITED STATES PATENT OFFICE 2,124,884

CELLULOSE ORGANIC ESTER COMPOSITION CONTAINING A DIPROPIONATE OF A POLYETHYLENE GLYCOL

Lester W. A. Meyer, Kingsport, Tenn., assignor, by mesne assignments, to Eastman Kodak Company, Jersey City, N. J., a corporation of New Jersey No Drawing. Application August 12, 1936, Serial No. 95,622

9 Claims. (Cl. 106—40)

This invention relates to compositions of matter in which cellulose organic acid esters, such as cellulose acetate, cellulose acetate-propionate and the like, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, film, artificial silk filaments, varnishes, lacquers and the like, and to produce compositions which will not injure, or be injured by, the substances or surfaces with which they are associated during manufacture. Another object of my invention is to produce compositions which can be molded at elevated temperatures and high pressures to produce plastic products having the desirable properties of hardness, toughness and elasticity.

Another object of my invention is to produce compounds which, when incorporated with cellulose organic acid esters, will produce compositions having the properties described above. A still further object of my invention is to provide a process of making these compounds. Other objects will become apparent to those skilled in the art to which this invention pertains.

While cellulose acetate has been known for decades, it has also been known that to utilize it in the various plastic arts it is necessary to mix therewith various plasticizing or conditioning agents. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, molded compounds and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not compatible or at least not sufficiently compatible with cellulose acetate to be used as plasticizers in cellulose acetate compositions.

I have discovered that valuable properties may be induced in and/or contributed to compositions containing organic acid esters of cellulose, such as cellulose acetate, by adding thereto, as a plasticizing compound, a dipropionate of a polyethylene glycol selected from the group consisting of diethylene glycol dipropionate and triethylene glycol dipropionate. The particularly useful properties which these compounds induce in or contribute to cellulosic compositions containing them are hereinafter enumerated.

The dipropionates of diethylene and triethylene glycols may be prepared from the respective glycols and propionic acid, the water formed being removed as the esterification proceeds. I give below examples of the method of preparing these two compounds.

*Example I. Diethylene glycol dipropionate.*— A mixture of 212.16 grams (2 gram-mols) of diethylene glycol, 326.24 grams (slightly over 4 gram-mols) of propionic acid, 1 cc. of concentrated sulfuric acid, and 400 cc. of toluene was refluxed for 2½ hours. A toluene-water azeotrope, boiling at approximately 84° C., was continuously collected, allowed to separate into two layers, and the toluene continuously returned to the reaction vessel. A slight amount of propionic acid came over with the toluene-water azeotrope, the water layer being found to contain 73.5 cc. of water and 6.5 cc. of propionic acid. 392 cc. of toluene was recovered. After 2½ hours of refluxing, water ceased to come over, indicating that the esterification was complete.

The reaction product was washed with sodium carbonate solution to neutralize the sulfuric acid and excess propionic acid remaining, then washed with water, and dried over calcium chloride. It was then distilled under reduced pressure. The diethylene glycol dipropionate boiled at 140–150° C. at 5 mm. pressure.

*Example II. Triethylene glycol dipropionate.—* A mixture of 300.22 grams (2 gram-moles) of triethylene glycol, 326.24 grams (slightly over 4 gram-moles) of propionic acid, 1 cc. of concentrated sulfuric acid, and 400 cc. of toluene was refluxed for 3 hours, a toluene-water azeotrope coming over and being treated in the same manner as in Example I. After 3 hours of refluxing, water ceased to come over. The water layer, which contained a small amount of acid, measured 81 cc. The reaction product was washed with sodium carbonate solution, then with water, and dried over calcium chloride. It was then distilled under reduced pressure. The triethylene glycol dipropionate boiled at 190–200 C. at 7 mm. pressure.

In order that those skilled in this art may better understand my invention I would state, by way of illustration, that for the manufacture of photographic film base or other sheets my new compositions of matter may be compounded as follows: 100 parts of acetone-soluble cellulose acetate, i. e., cellulose acetate containing from about 36% to 42% acetyl radical, approximately, is dissolved with stirring at atmospheric temperature in 300 to 500 parts, preferably 400 parts, by weight, of acetone. To this solution may be added from 10 to 50 parts by weight of diethylene glycol dipropionate or of triethylene glycol dipropionate. Within the limits stated, the amount of plasticizer may be decreased or increased, depending upon whether it is desired to decrease or increase, respectively, the properties which this plasticizer contributes to the finished product. The amount of solvent employed may also be increased or decreased, depending upon whether it is desired to have a more or less freely flowing composition, respectively.

A composition of matter prepared as above described may be deposited upon any suitable film-forming surface and the acetone evaporated therefrom to form a film or sheet, in a manner well known to those skilled in the art. A film so produced has permanently brilliant transparency and low inflammability, burning no more readily than ordinary newsprint. Films or sheets produced in accordance with my invention are very tough and flexible, and maintain flexibility in a superior fashion. For instance, a film of cellulose acetate plasticized with 25% (25 parts by weight per 100 parts of cellulose acetate) of triethylene glycol dipropionate had an initial flexibility between 3 and 4 times as great as that of cellulose acetate film containing no plasticizer.

Other volatile solvents which are compatible with the cellulose acetate and my new plasticizers will also occur to those skilled in this art, such as ethylene chloride-alcohol mixtures. In like manner these plasticizers may be compounded with other single organic acid esters of cellulose, such as cellulose propionate, butyrate, stearate and the like, or with mixed organic acid esters, such as cellulose acetate-stearate, cellulose acetate-propionate, cellulose acetate-butyrate, cellulose acetate-lactate, cellulose acetate-tartrate or the like, a suitable solvent which will dissolve both the cellulosic derivative and the plasticizer being employed, such, for instance, as an alkylene chloride with or without the addition of alcohol. For instance; cellulose acetate-propionate and my plasticizers may be dissolved in ethylene chloride or in a mixture of propylene chloride and methanol, and sheets of excellent flexibility may be deposited from these solutions. Other substances, such as fire-retardents, evaporation-retardents, etc., may be added to the film-forming compositions.

My novel plasticizers may also be advantageously used as plasticizers in cellulose organic acid ester molding compositions. For instance, about 25 to 125 parts of the plasticizer, depending on the hardness or softness of the plastic desired, may be homogeneously mixed with cellulose acetate, and the mixture converted into a transparent or translucent plastic product by molding at a temperature of 140–160° C. and a pressure of 2,500 to 4,000 pounds per square inch for a period of from 2 to 5 minutes, in a manner well known to those skilled in molding compounds of that nature. The softer plastics may be extruded through a die. A molded plastic containing 40 parts of diethylene glycol dipropionate per 100 parts of cellulose acetate showed a tensile strength of 6,000 lbs. per square inch, an elongation at the breaking point of 3.7%, excellent retentivity of plasticizer, and low water absorption and adsorption. Similar results are shown, for instance, with cellulose acetate-propionate and cellulose acetate butyrate. Molded or extruded products containing my novel plasticizers show excellent properties even at a temperature of −10° F.

Diethylene glycol dipropionate and triethylene glycol dipropionate are solvents for cellulose acetate in the cold, diethylene glycol dipropionate being a better solvent than triethylene glycol dipropionate. Heating assists the solvent action. For instance, when 40 parts or more of diethylene glycol dipropionate is worked on hot rolls with 100 parts of cellulose acetate, in the absence of any other solvent, it completely gelatinizes the cellulose acetate after a short period of mixing, giving a completely homogeneous plastic mass.

What I claim as my invention and desire to be secured by Letters Patent of the United States is:

1. A composition comprising a cellulose derivative and, as a plasticizer therefor, a polyethylene glycol dipropionate selected from the group consisting of diethylene glycol dipropionate and triethylene glycol dipropionate.

2. A composition comprising a cellulose derivative and, as a plasticizer therefor, diethylene glycol dipropionate.

3. A composition comprising a cellulose derivative and, as a plasticizer therefor, triethylene glycol dipropionate.

4. A composition comprising a cellulose derivative and, as a plasticizer therefor, an ester of diethylene glycol wherein both of the hydroxyl groups are esterified by a saturated fatty acid from the group consisting of propionic and butyric acids.

5. A composition comprising a cellulose organic acid ester and, as a plasticizer therefor, a polyethylene glycol dipropionate selected from the group consisting of diethylene glycol dipropionate and triethylene glycol dipropionate.

6. A composition comprising a cellulose organic acid ester and, as a plasticizer therefor, diethylene glycol dipropionate.

7. A composition comprising a cellulose organic acid ester and, as a plasticizer therefor, triethylene glycol dipropionate.

8. A transparent, flexible sheet comprising a cellulose organic acid ester and, as a plasticizer therefor, a polyethylene glycol dipropionate selected from the group consisting of diethylene glycol dipropionate and triethylene glycol dipropionate.

9. A molding composition adapted for molding under elevated temperatures and high pressures, comprising a cellulose organic acid ester and a polyethylene glycol dipropionate selected from the group consisting of diethylene glycol dipropionate and triethylene glycol dipropionate.

LESTER W. A. MEYER.